United States Patent [19]

Parkins

[11] 3,912,058
[45] Oct. 14, 1975

[54] HYDRAULIC CLUTCH AND CLUTCH BRAKE OPERATION

[75] Inventor: Derek Ray Parkins, Barton-le-Clay, England

[73] Assignee: SKF Industrial Trading and Development Company B.V., Jutphaas, Netherlands

[22] Filed: May 24, 1973

[21] Appl. No.: 363,696

[30] Foreign Application Priority Data
May 26, 1972 United Kingdom............... 25027/72
June 15, 1972 United Kingdom............... 28103/72

[52] U.S. Cl.......... 192/18 A; 192/111 A; 192/91 A; 192/13 R
[51] Int. Cl.².................F16D 11/06; F16D 13/60; B60K 41/24
[58] Field of Search.... 192/12 C, 13 R, 18 A, 91 A, 192/111 A

[56] References Cited
UNITED STATES PATENTS

| | | | |
|---|---|---|---|
| 2,501,005 | 3/1950 | Rockwell | 192/91 A |
| 2,564,281 | 8/1951 | Rockwell | 192/91 A X |
| 2,717,680 | 9/1955 | Smith | 192/91 A |
| 2,901,066 | 8/1959 | Garmager | 192/91 A X |
| 3,090,257 | 5/1963 | Schjolin et al. | 192/18 A X |
| 3,334,717 | 8/1967 | Spokas et al. | 192/91 A X |
| 3,540,557 | 11/1970 | Hasselbacher et al. | 192/18 A |
| 3,548,989 | 12/1970 | Root | 192/91 A X |
| 3,743,070 | 7/1973 | Howard et al. | 192/18 A X |

Primary Examiner—Samuel Scott
Assistant Examiner—Lance W. Chandler
Attorney, Agent, or Firm—Daniel M. Rosen

[57] ABSTRACT

A clutch withdrawal and clutch brake applying assembly including a hydraulic slave cylinder having a piston connected to a clutch operating member through a clutch withdrawal bearing and to a first brake operating member which is engageable with a second brake operating member, movement of which is arranged to apply the clutch brake, there being lost motion between the piston and the second brake operating member so that an initial movement of the piston moves the clutch operating member for disengaging the clutch and a further movement of the piston moves the clutch operating member further and also moves the second brake operating member for applying the clutch brake.

13 Claims, 3 Drawing Figures

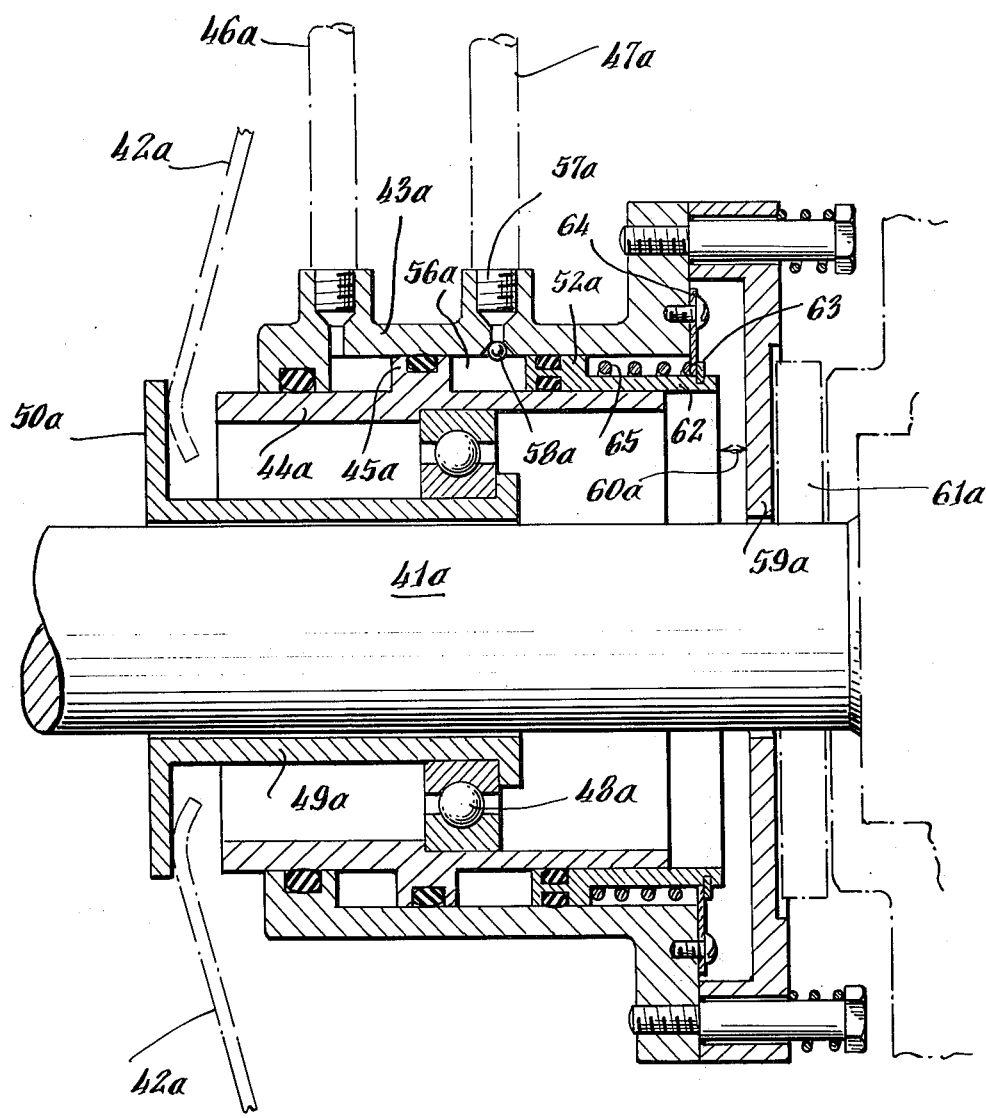

HYDRAULIC CLUTCH AND CLUTCH BRAKE OPERATION

In some motor vehicles, especially heavy commercial vehicles, the moment of inertia of the driven clutch member which extends between the clutch and the gear box is so great that it impedes upward gear changes. This is because an upward gear change cannot be made smoothly until the speed of rotation of the driven clutch member has dropped to the speed at which it will rotate when the higher gear is engaged.

In order to retard the speed of rotation of the driven clutch member more rapidly, a clutch brake is sometimes provided and this brake acts upon the driven clutch member and is applied after the clutch has been disengaged.

The present invention is concerned with an assembly which is intended to form part of a hydraulically operated clutch disengaging mechanism and which enables the clutch brake to be applied hydraulically with the use of a conventional hydraulic master cylinder operated by a clutch pedal.

According to this invention, a clutch withdrawal and clutch brake applying assembly includes a hydraulic slave cylinder having a piston connected to a clutch operating member through a clutch withdrawal bearing and to a first brake operating member which is engageable with a second brake operating member, movement of which applies the clutch brake, there being lost motion between the piston and the second brake operating member so that an initial movement of the piston moves the clutch operating member for disengaging the clutch and a further movement of the piston moves the clutch operating member further and also moves the second brake operating member for applying the clutch brake.

This assembly can be used with a single conventional clutch master cylinder and all that is necessary is to connect the slave cylinder to the master cylinder in the usual way. An initial movement of the clutch pedal of the vehicle then disengages the clutch and a further movement of the clutch pedal then applies the clutch brake retarding the rotation of the driven clutch member so that the selected gear ratio can quickly be engaged. The arrangement is simpler and less expensive than prior proposals in which two separate slave cylinders are provided, one for disengaging the clutch and the other for applying the clutch brake. This is because with two slave cylinders, it is either necessary to have two master cylinders, one for each slave cylinder and an arrangement by which the master cylinders are operated successively or alternatively it is necessary to have a master cylinder with two outlet ports, one leading to each slave cylinder and an arrangement by which hydraulic fluid is forced through one port to the clutch disengaging slave cylinder and subsequently through the other port to the brake applying slave cylinder. These arrangements consisting of either two separate master cylinders or a single specially constructed master cylinder add considerably to the overall expense of the mechanism as a whole.

As wear of the clutch lining of the vehicle clutch takes place, the normal position of the clutch disengaging member of the clutch, which may be withdrawal fingers, when the clutch is fully engaged moves axially. In consequence it is necessary for the clutch operating member of the assembly in accordance with the invention to move axially through the same distance as the clutch disengaging member so that the operating member remains constantly in engagement with the clutch disengaging member. This movement of the clutch operating member brought about by wear of the clutch lining causes a corresponding alteration in the datum position of the piston and this may alter the amount of lost motion between the piston and the second brake operating member. If this lost motion were to decrease, the clutch brake would eventually be applied either too soon after disengagement of the clutch, or even before the clutch has been fully disengaged and this would give rise to very rapid wear of both the clutch lining and the clutch brake lining. Preferably, therefore the assembly is constructed in such a way that movement of the datum position of the clutch operating member brought about by wear of the clutch lining is such as to increase the lost motion, but in this case the lost motion may become so great that the overall movement of the clutch operating member is insufficient to allow the clutch brake to be applied.

To overcome this difficulty, according to a further feature of the invention, the connection of the piston to the first brake operating member includes a hydraulic compensating chamber arranged to hold hydraulic fluid through which thrust from the piston is transmitted to the first brake operating member, the compensating chamber having a hydraulic fluid inlet which allows hydraulic fluid to enter the chamber as the distance between the piston and the first brake operating member increases to allow the datum position of the first brake operating member to remain constant as the datum positions of the clutch operating member and the piston change upon clutch lining wear taking place when the assembly is in use.

To enable the hydraulic compensating chamber to fill with additional hydraulic fluid as the datum position of the piston alters, the first brake operating member is preferably provided with a stop which, in use, limits its movement in a return direction upon release of fluid pressure in the slave cylinder to provide the lost motion and the assembly is arranged so that, in use, movment of the piston in response to wear of the clutch lining causes the chamber to be enlarged to draw in hydraulic fluid through the inlet.

The fluid inlet of the compensating chamber may be provided with a non-return valve so that the fluid, once drawn in, cannot flow out again. In this case it is necessary for the inlet to the compensating chamber to have a connection to a hydraulic fluid reservoir and this arrangement has the slight disadvantage that the assembly as a whole must then have two separate hydraulic fluid connections. The first connection leads from the slave cylinder to a master cylinder and the second connection leads from the compensating chamber to the hydraulic fluid reservoir.

In order to simplify the assembly therefore, in a preferred arrangement, the hydraulic fluid inlet of the compensating chamber is connected to a hydraulic fluid inlet of the slave cylinder and the chamber inlet is provided with a valve which, in use, closes upon the application to it of fluid pressure from a master cylinder but remains open to allow fluid to enter the chamber upon enlargement of the chamber taking place.

With the arrangement, the assembly has only a single hydraulic fluid connection when it is installed in a vehicle. This single connection leads from a master cylinder and when the master cylinder is operated by a clutch pedal, fluid flows through the connection into the slave cylinder to move the slave piston, but the valve in the inlet to the compensating chamber is closed so that no fluid is able to enter the compensating chamber. When the clutch pedal is released, however, and the first brake operating member returns into engagement with its stop, the valve will open to allow pressure equilibrium to be restored.

With this arrangement, a spring is preferably provided to produce a force between the clutch operating member and the first brake operating member to bias these members in a direction to decrease the size of the compensating chamber and, in use, to bias the clutch operating member against the clutch withdrawal fingers, or other clutch disengaging member, and to bias the first brake operating member against its stop.

The slave piston is preferably annular and is formed as a shoulder on a sleeve which fits within the slave cylinder to form an annular hydraulic pressure chamber between the sleeve and the cylinder. The first brake operating member may then be slidably mounted on the sleeve within the cylinder and the hydraulic compensating chamber is then also annular and is formed between a shoulder on the sleeve and the first brake operating member which is also annular.

In an alternative, and preferred arrangement, however, the first brake operating member is in the form of a second sleeve which is slidable within the sleeve which forms the slave piston. The second sleeve is provided with an outwardly projecting shoulder which slides within the slave cylinder and the hydraulic compensating chamber is then bounded around its outer periphery by the cylinder, around its inner periphery by parts of the two sleeves and at its end by shoulders, one on each of the two sleeves.

The clutch withdrawal bearing is preferably mounted within the sleeve forming the slave piston and the clutch operating member is then in the form of a further sleeve of smaller diameter mounted within the clutch withdrawal bearing. The sleeve which forms the clutch operating member then preferably projects axially beyond the sleeve which forms the slave piston and has a radially extending flange at its projecting end. It is this flange which, in use, is in engagement with the clutch withdrawal fingers or other clutch disengaging member of the clutch.

In a preferred example of the invention, there is a still further sleeve fixed to the inside of the sleeve which forms the slave piston and extending within the sleeve which forms the first brake operating member. The spring which produces a force between the clutch operating member and the first brake operating member is then a coiled compression spring which surrounds the still further sleeve and acts between an abutment on this sleeve and an abutment projecting inwards from the inner periphery of the sleeve forming the first brake operating member.

When the hydraulic fluid inlet of the compensating chamber is connected to the hydraulic fluid inlet of the slave cylinder, the valve which is provided in the inlet of the compensating chamber preferably has a closure member which is supported by a spring clear of a valve seat which is located between the closure member and the chamber. When the pressure within the chamber is the same as the pressure in the inlet on the outside of the closure member, the closure member is held off its seat by the spring so that hydraulic fluid can either flow into or out of the compensating chamber. However, when the pressure on the outside of the closure member is increased by operation of the master cylinder, this pressure moves the closure member against the action of its spring onto its seat and the hydraulic fluid supplied from the master cylinder can then flow only into the slave cylinder. The spring which holds the closure member off its seat under balanced pressure conditions is preferably in the form of an annular diaphragm spring with a restricted opening through it. The restricted opening permits a slow flow of fluid from one side of the spring to the other into or out of the chamber when the valve is open, but when an excess external pressure is applied by the master cylinder, this pressure acts both on the spring and on the closure member so that the spring force is readily overcome and the closure member moves onto its seat after only a minute inward flow has taken place through the restricted opening in the spring into the compensating chamber.

Three examples of assemblies constructed in accordance with the invention are illustrated in the accompanying drawings in which.

Figure 1:
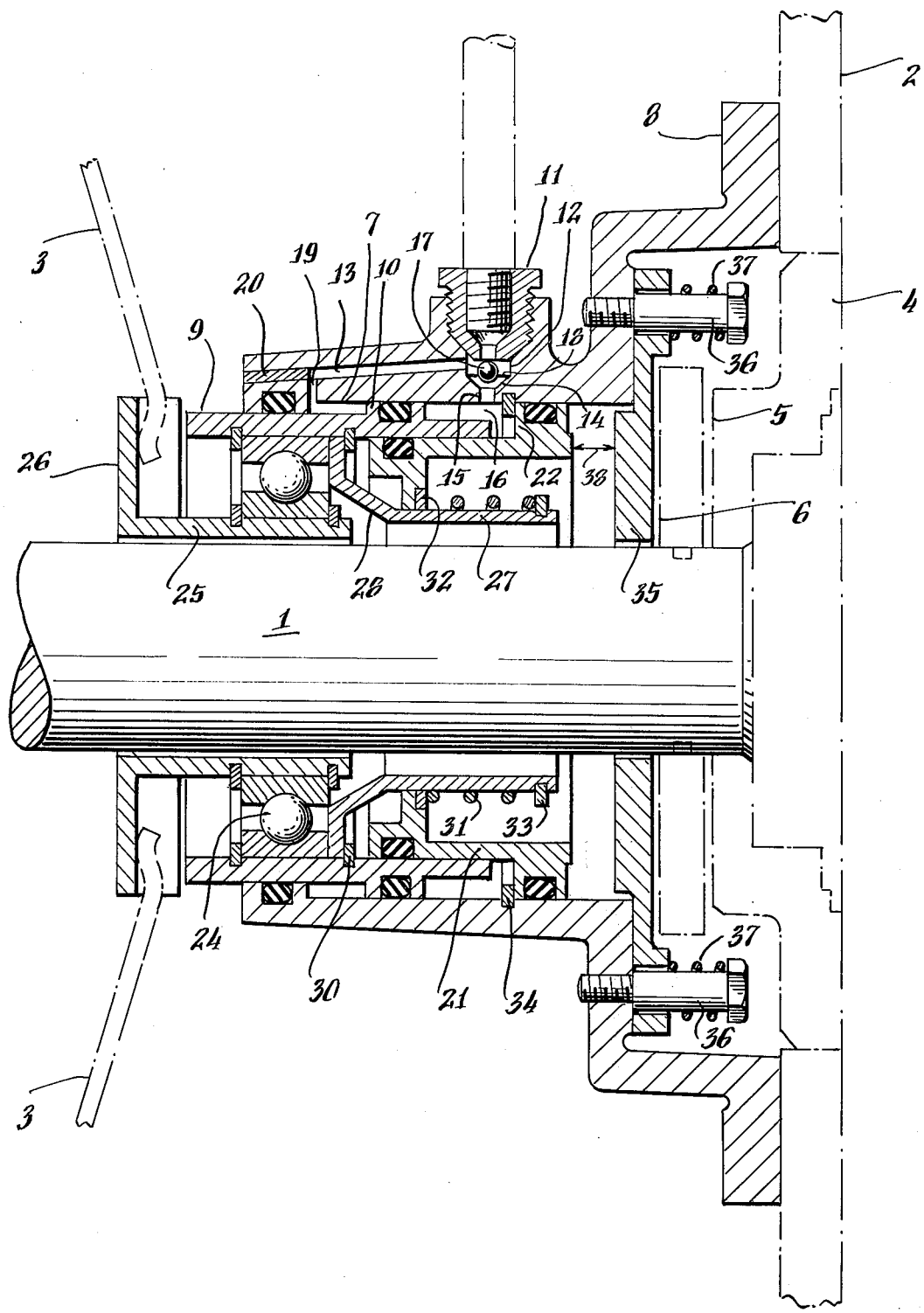
FIG. 1 is a diametric section through a first example of the assembly showing also, in outline, parts of a clutch and of a gear box between which the assembly is installed.

A clutch, which forms part of a vehicle in which the assembly shown in FIG. 1 is installed, has a driven shaft 1, a housing 2 and a clutch disengaging member in the form of spring-loaded clutch withdrawal fingers one of which is shown at 3. The shaft 1 also forms the input shaft of a gear box having a housing 4 with an end face 5. The shaft 1 has a brake disc 6 mounted on it. The brake disc 6 is splined to the shaft 1 so that it rotates with the shaft, but is movable axially relative to the shaft towards and away from the face 5.

A slave cylinder 7 surrounds the shaft 1 coaxially and has a radially projecting flange 8 by which it is fixed to the clutch housing 2. A sleeve 9 is mounted within the slave cylinder 7 and has an annular shoulder 10 which forms a slave piston. The slave cylinder 7 has a union 11 for connection of a hydraulic pressure pipe leading to a master cylinder and the union 11 communicates with a radial bore 12 and an axially extending passage 13.

The bore 12 has a valve seat 14 at its inner end and beyond the seat 14, a port 15 which forms an inlet to a hydraulic compensating chamber 16. A valve closure member 17 in the form of a ball is supported above the valve seat 14 by a diaphragm spring 18. The spring 18 has a restricted passage through it, which is not shown.

The passage 13 leads to an annular groove 19 which forms a hydraulic fluid inlet of the slave cylinder and the portion of the passage 13 on the side of the groove 19 remote from the union 11 is sealed by a plug 20.

A second sleeve 21 is slidable within the sleeve 9 and has a radially projecting shoulder 22 which slides within the slave cylinder 7. The shoulder 22 bounds one end of the compensating chamber 16, the other end being bounded by the shoulder 10 which forms the slave piston. A clutch withdrawal bearing 24 is a push fit within the sleeve 9 and its inner ring carries a third sleeve 25 which is rotatable and has a radially projecting flange 26 which forms a clutch operating member and is in engagement with the clutch withdrawal fingers 3. A fourth sleeve 27 has a radially projecting part 28 which is fixed to the inside of the sleeve 9 by being trapped between the bearing 24 and a circlip 30, and the sleeve 27 extends within the sleeve 21. A coiled compression spring 31 surrounds the sleeve 27 and acts between an inwardly projecting shoulder 32 on the sleeve 21 and a circlip 33 fixed to the sleeve 27. The spring 31 therefore tends to bias the sleeve 27 and with it the flange 26 which forms the clutch operating member towards the right and to bias the sleeve 21 which forms a first brake operating member towards the left. The flange 26 is therefore pressed against the clutch withdrawal fingers 3 and because it is located in this way, the shoulder 22 is pressed against the circlip 34 which forms a stop.

An annular plate 35 surrounds the shaft 1 coaxially and forms a second brake operating member. The plate 35 is axially slidable on a number of pins which are fixed to a portion of the flange 8 and one of which is shown at 36. The plate 35 is biased towards the left into contact with the flange 8 by a number of springs, one of which is shown at 37, surrounding the pins by which the plate 35 is carried. The sleeve 21 which forms the first brake operating member is located axially in position by the circlip 34 and the plate 35 which forms the second brake operating member is located axially by the face of the flange 8 with which it is in contact. There is thus a fixed clearance 38 between the sleeve 21 and the plate 35 giving rise to lost motion between these two parts when the sleeve 21 moves towards the right.

In order to disengage the clutch and apply the clutch brake to the shaft 1 which forms the driven clutch member, a clutch pedal is depressed to operate the master cylinder connected to the union 11. This forces hydraulic fluid under pressure through the union 11 and after a minute initial flow, the pressure of the hydraulic fluid urges the closure member 17 onto its seat 14 so that the subsequent flow of fluid from the master cylinder takes place through the passage 13 and the groove 19 into the slave cylinder 7 where it acts upon the shoulder 10 and moves the sleeve 9 towards the right. The flange 26 follows the initial movement of the sleeve 9 and moves the clutch withdrawal fingers 3 towards the right thus disengaging the clutch. The sleeve 21 also moves toward the right since a force is transmitted to it from the shoulder 10 through the hydraulic fluid trapped in the chamber 16. Even as the pressure in the chamber 16 increases, the closure member 17 remains on its seat to maintain the valve closed because the pressure within the union 11 is always higher than that within the chamber 16. After the sleeve 21 has moved sufficiently to take up the clearance 38, it engages with the plate 35 and then moves the plate 35 towards the right to cause the brake disc 6 to be clamped between the plate 35 and the gear box end face 5 so that the disc 6 and with it the shaft 1 is retarded.

On release of the clutch pedal, the flange 26 and the parts attached to it are moved towards the left by the clutch withdrawal fingers 3 and the spring 31 assists the sleeve 21 also to move towards the left until the shoulder 22 engages with the circlip 34.

As wear of the clutch lining takes place, the clutch withdrawal fingers 3 move further towards the left than the position shown in the drawing, and shoulder 10 will move away from the shoulder 22 after the shoulder 22 has engaged the circlip 34 and the volume of the compensating chamber 16 is slightly increased. In order to compensate for this wear, after each re-engagement of the clutch the valve closure member 17 is lifted off its seat 14 by the spring 18 and allows pressure equilibrium to be restored.

Figure 2:
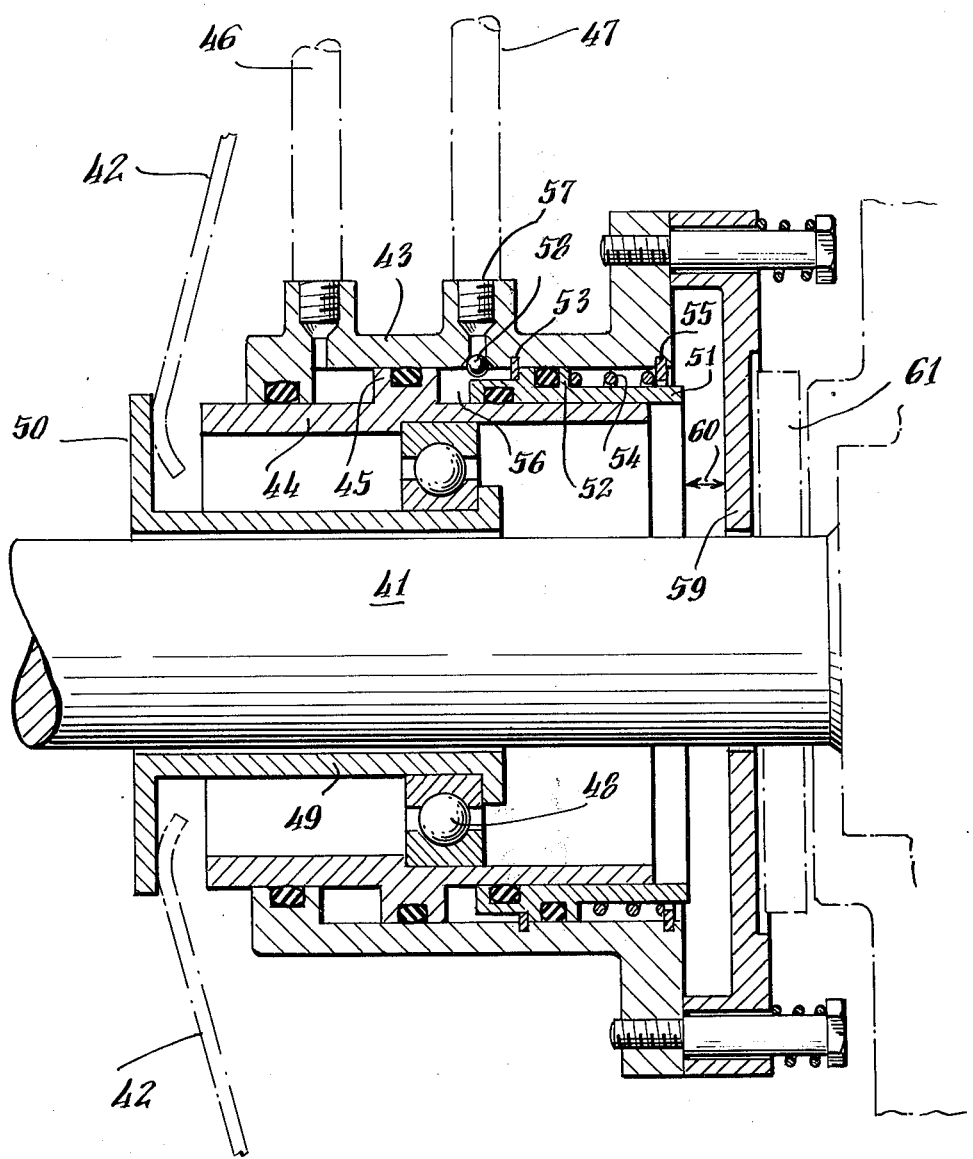
FIG. 2 is a diametric section through a second example also showing in outline parts of a clutch and gear box; and, FIG. 3 is a diametric section similar to FIG. 2, but of a third example.

In the example shown in FIG. 2 of the drawings, a clutch of the vehicle in which the assembly shown is installed has a driven shaft 41 and clutch withdrawal fingers one of which is indicated at 42. A slave cylinder 43 surrounds the shaft 41 coaxially and contains a sleeve 44 with a shoulder 45 which forms an annular slave piston. The cylinder 43 has a hydraulic connection 46, which leads from a master cylinder and a second hydraulic connection 47 leading from a hydraulic fluid reservoir.

Within the sleeve 44 is a clutch withdrawal bearing 48 which is a deep groove radial ball bearing and, supported within the inner bearing ring of this bearing is a second sleeve 49 having a flange 50 which forms a clutch operating member and engages with the fingers 42.

A sleeve 51 which forms a first brake operating member slides on the sleeve 44 and has a shoulder 52 which slides in the slave cylinder 43. The sleeve 51 is biased towards the left as seen in FIG. 2 of the drawings against the circlip 53 by a spring 54 which itself acts against a second circlip 55.

A hydraulic compensating chamber 56 is formed between the shoulder 45 and the shoulder 52 within the cylinder 43 and this chamber has an inlet 57 for hydraulic fluid leading to the connection 47. The inlet 57 is provided with a non-return valve 58 which allows hydraulic fluid to enter the chamber 56 if this increases in volume, but prevents the fluid from being subsequently expelled.

When the master cylinder of the vehicle is operated by the clutch pedal, the clutch is released as in the first example, by movement of the flange 50 towards the right, but there is lost motion as the right-hand end of the sleeve 51 approaches an annular plate 59 which corresponds to the plate 35 in the first example and forms the second brake operating member. As soon as this lost motion which has the extent of a clearance 60 has been taken up, the sleeve 51 moves the plate 59 towards the right against a brake disc 61, which is splined on the shaft 41 so that the clutch brake is applied as in the first example.

When wear of the clutch lining takes place, the sleeve 49 and with it the sleeve 44 moves towards the left as in the first example, but the sleeve 51 is prevented from moving towards the left by the circlip 53 and in consequence the hydraulic compensating chamber 56 is increased in axial length and more hydraulic fluid is drawn into it through the inlet 57. Thus as soon as the sleeve 44 is again moved towards the right under the action of the clutch master cylinder, the sleeve 51 moves with it as the thrust is transmitted through the hydraulic fluid in the chamber 56 and again the clutch brake is operated by movement of the plate 59 as soon as the constant amount of lost motion has been taken up.

The third example shown in FIG. 3 is very similar to the example shown in FIG. 2 and corresponding parts have been given the same reference numerals, but followed by the suffix *a*. However, in this example a sleeve 62 which performs the same function as the sleeve 51 in the second example is fitted with a circlip 63 which comes into engagement with a fixed plate 64 to restrict the movement of the sleeve 62 towards the left under the action of a spring 65.

The operation of this example, both for disengaging the clutch and applying the clutch brake, and also for the compensation of clutch lining wear is exactly similar to the second example.

What is claimed is:

1. In a clutch withdrawal and clutch brake applying assembly for disengaging clutch drive and driven members and applying a brake means to retard rotation of said driven member, and operable with a source of hydraulic fluid, the assembly comprising, a hydraulic slave cylinder, a slave piston axially movable in said cylinder, a clutch operating member connected to said piston for engaging and disengaging said clutch members upon axial movement of said piston, a second brake operating member for applying said brake means for retarding rotation of the clutch driven member, a first brake operating member axially movable to an actuated position for engagement with said second brake operating member to energize same, means resiliently urging said first brake operating member to a withdrawn position with a lost motion space provided between said withdrawn position and its actuated position, means using said hydraulic fluid for applying hydraulic pressure on said piston, with initial axial movement thereof moving said clutch operating member to disengage said clutch members, and further axial movement thereof applying hydraulic pressure on said first brake operating member which moves axially from the withdrawn position to its actuated position for energizing said second brake-operating member, said cylinder and piston having defined between them an annular space operable as a hydraulic compensating chamber for containing hydraulic fluid, where thrust from said further axial movement of said piston is transmitted via said fluid in said chamber to said first brake operating member, and means for flowing hydraulic fluid into said compensating chamber prior to said axial movement of the piston for disengaging the clutch members, for filling said chamber with said fluid even when its volume is increased due to wear of said clutch assembly members, so that with thrust transmitted via the fluid in said chamber, the datum position of the first brake-operating member is maintained constant.

2. An assembly according to claim 1 wherein said slave piston comprises a first cylindrical sleeve with a first shoulder extending radially outward and engaging the bore of said slave cylinder, with an annular hydraulic pressure chamber defined between said sleeve and said slave cylinder's bore.

3. An assembly according to claim 2 wherein said first brake-operating member comprises a second cylindrical sleeve axially movable within said first sleeve and having a second shoulder extending radially outward and engaging said slave cylinder's bore, with said compensating chamber being bounded on its ends by said first and second shoulders, on its outer periphery by said bore, and on its inner periphery by parts of said first and second sleeves.

4. An assembly according to claim 3 wherein said clutch withdrawal member comprises a third cylindrical sleeve, and said assembly further comprises a clutch withdrawal bearing between said clutch operating member and said slave piston.

5. In a clutch assembly for moving a clutch operating member to disengage a clutch drive member from the clutch driven member on a rotatable shaft, and for applying a brake means to retard the speed of rotation of said clutch driven member, the assembly operable with a source of hydraulic fluid and comprising a housing and first, second, and third, generally coaxial cylinders, the first cylinder (slave cylinder) fixed to said housing and surrounding said shaft, the second cylinder (slave piston) being coaxially situated between said first cylinder and said shaft with a first shoulder extending radially outward and engaging said first cylinder and defining at opposite ends of said first shoulder first and second annular spaces between said first and second cylinders, said second cylinder also engaged to said clutch operating member with said second cylinder being axially movable between an engaged position where said clutch drive and driven members are engaged and a withdrawn position where said clutch members are disengaged, said withdrawn position being variable as said clutch becomes worn, the third cylinder being situated radially inward of the first cylinder, being axially movable, and having a second shoulder extending radially outward and engaging said first cylinder, said second shoulder being axially spaced from said first shoulder and defining a remote end of said second annular space, the third cylinder also having a contact part for engaging said brake means, means for flowing said hydraulic fluid into said first annular space for driving said second cylinder a first axial distance which moves said clutch operating member to said withdrawn position to disengage the clutch, and subsequently a second axial distance with the first shoulder thereof urged toward said second shoulder which compresses fluid in said second annular space and thereby urges said third cylinder via force on its second shoulder toward said braking means for energizing same to retard speed of said driven member, and means for flowing said fluid into and filling said second annular space even when its volume is increased due to wear of said clutch assembly members, prior to flowing said fluid into said first annular space so that with thrust transmitted via said fluid in said first space, the datum position of the braking means is maintained constant regardless of varying positions of said second cylinder and clutch operating member due to wear thereon.

6. In a clutch withdrawal and clutch brake applying assembly operable with a clutch and a quantity of hydraulic fluid and including a hydraulic slave cylinder, a slave piston movable within said cylinder, means for communicating said fluid under pressure to said slave piston for moving same in a first direction, and a clutch operating member including clutch lining for engaging said clutch, with said clutch brake comprising first and second brake members, the improvement in combination therewith for establishing a constant datum position of said first brake member as datum positions of said clutch operating member and said slave piston change upon clutch lining wear occuring during use of said assembly, and wherein an initial movement of the slave piston moves the clutch operating member for disengaging the clutch, and further movement of the slave piston moves the first brake member in said first direction which engages said second brake member and thereby applies said clutch brake, said assembly further comprising a hydraulic compensating chamber defined in part by surfaces of said slave piston and said first brake member and including inlet means for receiving said hydraulic fluid, whereby thrust from said further movement of said slave piston is transmitted through said hydraulic fluid in said chamber to said first brake member for moving same, said assembly further comprising means for releasing fluid pressure on said slave piston and for urging said piston and first brake member to move in a return direction opposite said first direction, said first brake member further comprising a stop for limiting its movement in said direction to provide lost motion between said members, said chamber fluid inlet means permitting additional fluid to enter the chamber as the internal volume therein increases when the distance between said surfaces of the slave piston and the first brake member increases due to said clutch lining wear, and thereby establishing a constant datum position for said first brake member.

7. An assembly according to claim 6, operable with a reservoir of said hydraulic fluid, and further comprising a non-return valve in said hydraulic fluid inlet so that fluid once drawn into said compensating chamber cannot flow out again, and means connecting the inlet to said hydraulic fluid reservoir.

8. An assembly according to claim 6, further comprising spring means to produce a force between the clutch operating member and the first brake member to bias these members in a direction to decrease the size of the compensating chamber and, in use, to bias the clutch operating member against a clutch disengaging member and to bias the first brake.

9. An assembly according to claim 6, wherein the slave piston is annular and is formed as a shoulder on a sleeve which fits within the slave cylinder to form an annular hydraulic pressure chamber between the sleeve and the cylinder.

10. An assembly according to claim 9, in which the first brake member is annular and slidably mounted on the sleeve within the cylinder and the hydraulic compensating chamber is annular and is formed between a shoulder on the sleeve and the first brake member.

11. An assembly according to claim 9, wherein said first brake member is in the form of a second sleeve which is slidable within the sleeve which forms the slave piston, the second sleeve being provided with an outwardly projecting shoulder which slides within the slave cylinder and the hydraulic compensating chamber being bounded around its outer periphery by the cylinder, around its inner periphery by parts of the two sleeves and at its ends by shoulders, one on each of the two sleeves.

12. An assembly according to claim 11, further comprising a clutch withdrawal bearing mounted within the sleeve forming the slave piston and the clutch operating member is in the form of a further sleeve of smaller diameter mounted within the clutch withdrawal bearing and which projects axially beyond the sleeve that forms the slave piston and has a radially extending flange at its projecting end.

13. An assembly according to claim 12 further comprising a still further sleeve fixed to the inside of the sleeve which forms the slave piston and extending within the sleeve which forms the first brake operating member, and said spring means comprises a coiled compression spring which surrounds the still further sleeve, said assembly further comprising a first abutment on the still further sleeve and a second abutment projecting inwards from the inner periphery of the sleeve forming the first brake member, with said spring acting between said abutments.

* * * * *